(12) United States Patent  (10) Patent No.: US 8,891,269 B2
Ye et al.  (45) Date of Patent: Nov. 18, 2014

(54) FULL BRIDGE CONVERTER

(75) Inventors: Zhong Ye, Plano, TX (US); Shanguang Xu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 559 days.

(21) Appl. No.: 13/269,919

(22) Filed: Oct. 10, 2011

(65) Prior Publication Data

US 2013/0088895 A1  Apr. 11, 2013

(51) Int. Cl.
*H02M 7/44* (2006.01)
*H02M 1/40* (2007.01)
*H02M 3/337* (2006.01)

(52) U.S. Cl.
CPC ............... *H02M 1/40* (2013.01); *H02M 3/337* (2013.01)
USPC ........................................................... 363/98

(58) Field of Classification Search
USPC ............................................. 363/17, 98, 132
See application file for complete search history.

(56) References Cited

U.S. PATENT DOCUMENTS

| | | | | |
|---|---|---|---|---|
| 6,485,487 B1 * | 11/2002 | Sherman | .......................... | 606/34 |
| 6,559,652 B2 * | 5/2003 | Carrillo | .......................... | 324/522 |
| 6,664,762 B2 * | 12/2003 | Kutkut | ............................ | 320/116 |
| 7,755,299 B2 * | 7/2010 | Weger | ............................ | 315/279 |
| 2002/0125838 A1 * | 9/2002 | Tsai | ................................ | 315/276 |

* cited by examiner

*Primary Examiner* — Adolf Berhane
(74) *Attorney, Agent, or Firm* — William B. Kempler; Frederick J. Telecky, Jr.

(57) ABSTRACT

Methods and circuits for balancing current in a transformer are disclosed herein. An embodiment of the method includes sensing the magnitude and direction of current flow through the primary side of the transformer. The magnitude of current flowing in a first direction is compared to the magnitude of current flowing in a second direction through the primary side of the transformer. An AC signal driving the primary side of the transformer is adjusted so that the current flow in the first direction is substantially the same as current flow in the second direction.

18 Claims, 3 Drawing Sheets

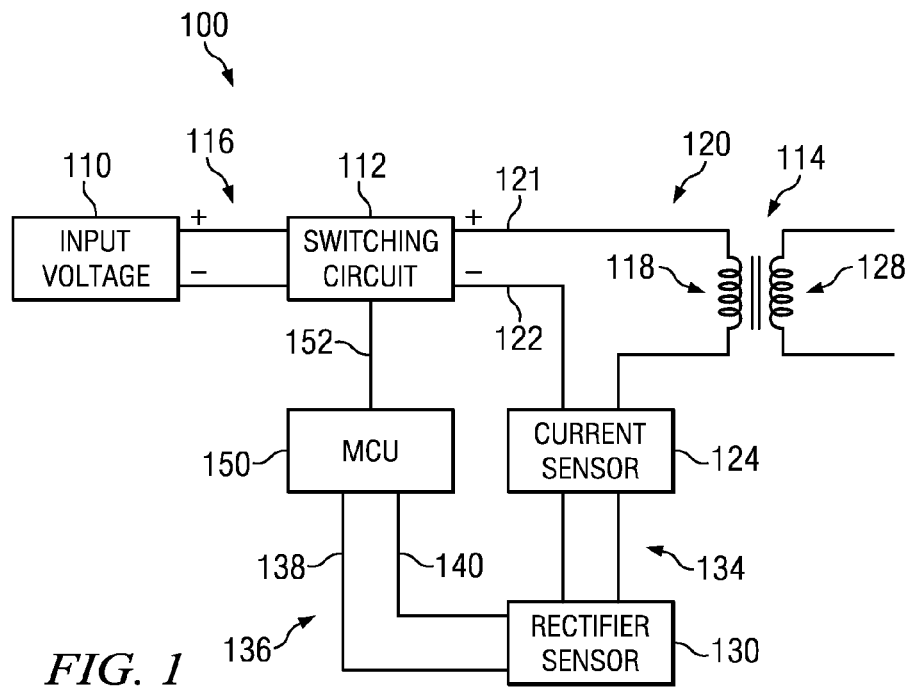

FULL BRIDGE CONVERTER

BACKGROUND

Full bridge converters use a switching circuit to generate a voltage, step a voltage up or down, or to isolate a voltage from a source. For example, a DC voltage may be input to the switching circuit. The switching circuit generates an AC signal based on the DC voltage to drive the primary side of a transformer (sometimes referred to herein simply as the "primary"). The transformer may step the voltage up or down. The AC voltage on the secondary side of the transformer (sometimes referred to herein simply as the "secondary") may be used or rectified to a DC voltage.

In order to accurately control the output on the secondary side of the transformer, the voltage on the primary is adjusted. For example, the switching circuit may generate a pulse width modulated (PWM) signal that is used to drive the primary of the transformer. By adjusting the duty cycle of the PWM signal, the amplitude of output voltage on the secondary can be adjusted.

Although the PWM signal provides for very accurate adjustment of the primary, and thus, the secondary, the positive and negative duty cycles may not be equal. Therefore, current flowing in a first direction through the primary of the transformer may not be equal to the current flowing in a second and opposite direction. The result is the accumulation of a DC flux in the transformer, which can cause transformer saturation and circuit failure. Many embodiments of full bridge converters use DC blocking capacitors in series with the primary to block the DC voltage. The blocking capacitors are subject to failure, especially when they are subjected to high current flow in a power supply. The failure of a blocking capacitor can damage components connected to the full bridge converter.

SUMMARY

Methods and circuits are disclosed herein that balance the current flow in a transformer, which eliminates the accumulation of DC current in the transformer. The transformer is driven by an AC source that is controllable by a processor. For example, a series of switches controlled by the processor may generate a pulse width modulated signal that drives the primary of the transformer. The current flow through the primary of the transformer is monitored by a current sensor. The current sensor outputs the direction and magnitude of current flow to the processor. The processor then controls the switches to adjust the duty cycles of the AC signal so that current flowing in a first direction through the primary of the transformer is substantially the same as current flowing in a second direction.

BRIEF DESCRIPTION OF THE DRAWINGS

FIG. 1 is a block diagram of an embodiment of a full bridge converter with devices to detect current and adjust the duty cycle of the full bridge converter.

FIG. 2 is a flowchart describing the operation of the full bridge converter of FIG. 1.

DETAILED DESCRIPTION

Figure 3:
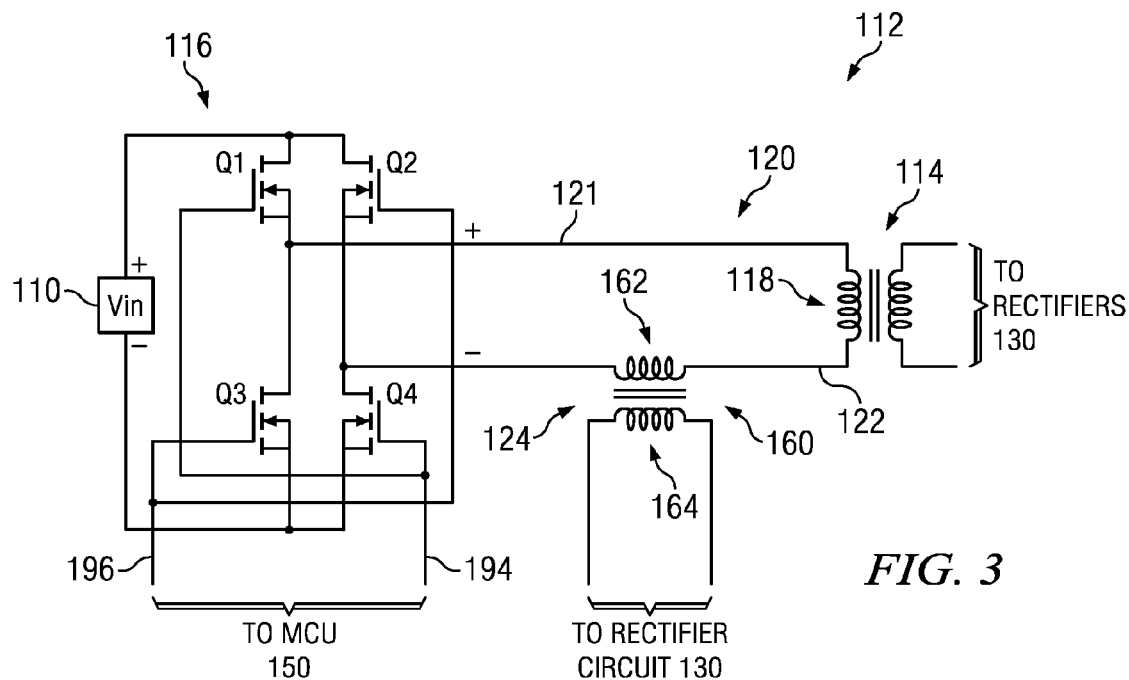
FIG. 3 is a schematic diagram of an embodiment of the switching circuit of FIG. 1.

Methods and circuits to balance flux in full bridge converters are disclosed herein. Full bridge converters generate an AC signal or convert a DC voltage to a different voltage. Full bridge converters typically have a switching circuit, such as FETs or other switching devices that generate an AC signal. The AC signal drives the primary side of a transformer. It follows that an AC voltage is output on the secondary side of the transformer. The output voltage on the secondary side of the transformer may be controlled by adjusting the duty cycle of the AC voltage driving the primary side of the transformer. In the embodiment described above, the duty cycle may be adjusted by adjusting the time in which the FETs are turned on and off.

The transformer is driven by AC signals, which can be sinusoidal signals or other signals, such as pulse width modulated (PWM) signals. For description purposes herein, an AC signal is described as having a first duty cycle when the current flows in a first direction through the primary of the transformer and a second duty cycle when the current through the primary of the transformer flows in a second direction that is opposite the first direction. The combination of the first duty cycle and the second duty cycle is considered to be one cycle of the AC signal driving the transformer. For example, if the transformer is driven by a sine wave, the positive portion of the sine wave may be considered to be the first duty cycle and the negative portion of the sine wave may be considered to be the second duty cycle.

In the case of a sine wave driving a transformer, the two duty cycles are typically equal. Therefore, the flux current (hereinafter simply "flux") in the transformer is substantially balanced. More specifically, flux generated by the first duty cycle is substantially equal, but in an opposite direction, to flux generated by the second duty cycle. The result is that there is no net sum of DC current generated within the core of the transformer.

In many situations, signals more complex than sine waves are used to drive the transformer. For example, PWM signals may be generated by a full bridge converter and used to drive the transformer. A DC voltage may be input to the full bridge converter. FETs and/or other switching devices may be used to convert the DC voltage to PWM signals that drive the transformer. The FETs may be controlled by digital controllers, which provide enhanced control over the output voltage that is generated by the full bridge rectifier. However, the FETs and other switching devices have tolerances and gate driver circuit mismatching that can cause their operating parameters to change. It follows that their ability to generate the same first and second duty cycles diminishes, which leads to a flux imbalance in the transformer.

When the flux is imbalanced, it causes a DC current to flow in the primary side of the transformer. The DC current reduces the effective usage of the core of the transformer, which reduces the output power capacity of the full bridge converter. If the imbalanced flux is substantially high, the resulting DC current can saturate the magnetic core of the transformer, which can damage the transformer. Even rather small DC currents can produce power losses and reduce the power efficiency of the transformer. More significant problems occur because the imbalance accumulates which increases the likelihood of causing failure to components connected to the full bridge converter.

In summary, the circuits and methods disclosed herein monitor the current in the primary side of a transformer during the first and second duty cycles. The currents generated by the duty cycles are compared to each other to determine if the duty cycles are generating different magnitudes of current. If the current magnitudes are different, the firmware or the like changes the duty cycles in order to balance the current, which balances the flux.

Having summarily described full bridge converters, circuits and methods for balancing flux in transformers associated with full bridge converters will now be described in greater detail.

An embodiment of a full bridge converter 100 and devices for monitoring current flow and adjusting duty cycle are shown in the block diagram of FIG. 1. The full bridge converter 100 includes an input voltage 110, a switching circuit 112, and a transformer 114. The input voltage 110 may output a DC voltage that is to be stepped up or down. The input voltage 110 is connected to the switching circuit 112 by way of conductors 116. In the embodiment of the input voltage 110 described herein, the input voltage 110 is a DC voltage and is marked with a positive terminal and a negative terminal. The switching circuit 112 converts the input voltage 110 to an AC voltage that drives the primary side 118 of the transformer 114. Conductors 120 are connected between the switching circuit 112 and the transformer 114. A current sensor 124 is connected to one of the conductors 120 in order to measure the current supplied to the primary side 118 of the transformer 114.

The switching circuit 112 has a positive (+) terminal and a negative (−) terminal that are associated with a positive conductor 121 and a negative conductor 122, respectively. When current is flowing from the positive terminal to the negative terminal, the current flowing in the conductors 120 is referred to as being in a positive direction. When the current is flowing from the negative terminal to the positive terminal through the conductors 120, the current is referred to as flowing in a negative direction.

The transformer 114 may be a conventional transformer having a primary side 118 and a secondary side 128. The transformer 114 has a core in which magnetic flux flows. An objective of the methods and circuits described herein is to balance the magnetic flux in the transformer 114. More specifically, DC currents in the core are minimized or eliminated by adjusting the drive signal to the primary side 118 of the transformer 114.

The current sensor 124 determines the current flow through the conductors 120, which is the current flow through the primary side 118 of the transformer 114. The current sensor 124 may be substantially similar to a current meter placed in line with the primary side 118 of the transformer 114. In other embodiments, the current sensor 124 may be a tap from the transformer 114 wherein a voltage present on the tap may be representative of the current flow through the primary side 118 of the transformer 114. In the embodiments described below, the current sensor 124 is itself a transformer. It is noted that the current sensor 124 outputs a voltage that is indicative of the magnitude and direction of current flowing through the primary side 118 of the transformer 114.

A rectifier circuit 130 is connected to the current sensor 124 via conductors 134. The rectifier circuit 130 converts an AC signal generated by the current sensor 124 to DC signals. The DC signals are output on conductors 136, which are referred to individually as the positive conductor 138 and the negative conductor 140. A voltage is generated on the positive conductor 138 when a positive current flow is detected in the conductors 120. The magnitude of the voltage on the positive conductor 138 is representative of the magnitude of current flow. Likewise, a voltage is generated on the negative conductor 140 when negative current is detected in the conductors 120 and the magnitude of the voltage is representative of the magnitude of the current.

The conductors 136 are connected to the input of a multiprocessor, MCU 150. The MCU 150 compares the voltage on the positive conductor 138 to the voltage on the negative conductor 140 to determine if the positive and negative current flows in the conductors 120 are the same. If there is a difference, then a DC current is being generated in the transformer 114, which causes a cumulative build up of current from the transformer 114. This cumulative build up of current causes the problems described above and may damage components connected to the full bridge converter 100.

The MCU 150 outputs signals to the switching circuit 112 via a line 152. The line 152 may consist of several conductors that control individual switches within the switching circuit 112 as described in greater detail below. By controlling the switching, the MCU 150 is able to adjust the duty cycle applied to the transformer 114, which is used to balance the current driving the transformer 114.

Having described the components of the full bridge converter 100, its operation will now be described. Further below, the components will be described in greater detail followed by a more detailed description of the operation. Additional reference is made to FIG. 2, which is a flow chart illustrating the operation of the full bridge converter 100.

The input voltage 110 is applied to the switching circuit 112 by way of conductors 116 as shown in step 153 of FIG. 2. In the embodiment described herein, the input voltage is a DC voltage. The switching circuit 112 converts the input voltage to an AC voltage as shown in step 154 of FIG. 2. In some embodiments, the input voltage is used to drive the switching circuit 112, so the switching circuit 112 does not necessarily convert the input voltage 110 to an AC voltage.

An AC voltage, such as a PWM signal is output from the switching circuit 112 to the primary 118 of the transformer 114 by way of the conductors 120 as shown in step 155 of FIG. 2. The current also passes through the current sensor 124. In the embodiment described herein, the current sensor 124 is itself a transformer that generates an AC voltage that is representative of the direction and magnitude of current flow through the primary 118 of the transformer 114. The current is sensed in step 156 of FIG. 2.

Because the current sensor 124 generates an AC voltage, it needs to be rectified in order to be used in processing. Therefore, the AC voltage is output to the rectifier circuit 130 by way of conductors 134. The rectifier circuit outputs voltages to the MCU 150 on conductors 136. The voltages are representative of the current driving the primary 118 of the transformer 114. The magnitude of DC voltage on the positive conductor 138 is representative of the magnitude of positive current flow through the primary 118 of the transformer 114. Likewise, the magnitude of DC voltage on the negative conductor 140 is representative of the negative current flow through the primary 118 of the transformer 114.

The MCU 150 analyzes the voltages on the conductors 136 to determine if the transformer 114 is generating a DC current. More specifically, if either the positive or negative current flow is greater than the other, a DC current is being generated and will cause the problems described above. Thus, the MCU determines if the current flow through the primary 118 of the transformer 114 is out of balance as shown by the decision 157 of FIG. 2.

In order to prevent this problems associated with an out of balance current flow, the MCU 150 changes the duty cycle of the AC voltage driving the primary 118 of the transformer if the current is out of balance. This step is illustrated in step 158 of FIG. 2. For example, the first duty cycle may be extended and the second duty cycle may be reduced, which may increase the positive flow of current in the primary 114 of the transformer. The result is a balanced current flow through the primary 114 of the transformer 118, which prevents the generation of a DC current. If the current flow is balanced, the duty cycles are not changed as illustrated at step 159 of FIG. 2.

Having described the overall operation of the full bridge rectifier 100, the individual components will now be described in greater detail.

Reference is made to FIG. 3, which is a schematic diagram of an embodiment of the switching circuit 112. The switching circuit 112 includes four switches, Q1, Q2, Q3, and Q4, which may be FETs or other solid state switching devices. In the embodiment of FIG. 3, the switches Q1-Q4 are FETs and may be referred to as FETs Q1-Q4. The drain of Q1 is connected to the drain of Q2, which are connected to the positive terminal of the input voltage 110. The source of Q1 is connected to the drain of Q3 and the source of Q2 is connected to the drain of Q4. The positive conductor 121 from the switching circuit 112 connects to the junction of Q1 and Q3 and the negative conductor 122 connects to the junction of Q2 and Q4. The source of Q3 and Q4 are connected to the negative terminal of the input voltage 110.

The gate of Q1 is connected to the gate of Q4, which are connected to the MCU 150. The gate of Q2 is connected to the gate of Q3, which are also connected to the MCU 150. It follows that Q1 and Q4 are controlled together by the MCU 150 as are Q2 and Q3. Therefore, Q1 and Q4 are both either open or closed as are Q2 and Q3. In other embodiments, the switches may be controlled individually by the MCU 150.

The positive conductor 121 and the negative conductor 122 are connected to the primary 118 of the transformer via the current sensor 124. As described above, the current sensor 124 is a current transformer 160. The primary side 162 of the current transformer 160 is located in series with the negative conductor 122. The current passing through the primary side 162 of the current transformer 160 is equal to the current passing through the primary side 118 of the transformer 114. The secondary side 164 of the current transformer 160 is connected to the rectifier circuit 130 as described in greater detail below.

Having described the components of the switching circuit 112 and its association with the transformer 114 and the current sensor 124, the operation of the switching circuit 112 will now be described. The input voltage 110 is applied to the switching circuit 112 by way of the conductors 116. During the first duty cycle, Q1 and Q4 are closed and Q2 and Q3 are open. Therefore, during the first duty cycle, current flows from the positive terminal of the input voltage 110, through Q1 to the positive conductor 121 and to the primary 118 of the transformer 114. The current then flows out of the primary 118, through the current transformer 160 and to the negative conductor 122. In the switching circuit 112, the current flows through Q4 and back to the input voltage 110.

During the second duty cycle, Q1 and Q4 are open and Q2 and Q3 are closed. In summary, current flows in the opposite direction as with the first duty cycle. More specifically, current from the voltage source 110 passes through Q2 to the negative conductor 122, through the current transformer 160, and to the primary 118 of the transformer 114. The current then flows from the primary 118 of the transformer by way of the positive conductor 121, through Q3 and back to the input voltage 110. The duty cycles can be changed by changing the time in which Q1-Q4 are open and closed. It follows that the signal generated on the conductors 120 is a pulse width modulated (PWM) signal wherein the widths are dependent on the time in which the switches Q1-Q4 are open or closed.

It is noted that during the first duty cycle, the current flows in a first direction through the primary 162 of the current transformer 160 and during the second duty cycle, the current flows in the opposite direction through the primary 162 of the current transformer 160. When current passes through the primary 162, it generates a voltage on the secondary 164 that is representative of the magnitude and direction of the current flowing through the primary 162. Thus, the voltage generated at the secondary 164 of the current transformer 160 is representative of the direction and magnitude of current passing through the primary 118 of the transformer 114.

Figure 4:
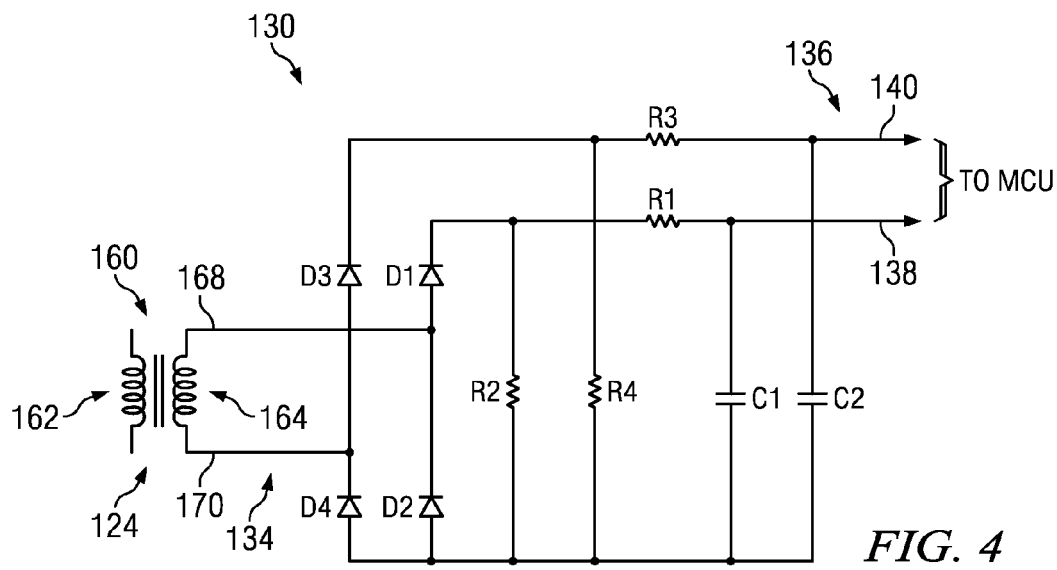
FIG. 4 is a schematic diagram of an embodiment of the rectifier circuit of FIG. 1.

An embodiment of the rectifier circuit 130 will now be described in detail. FIG. 4 is an embodiment of the rectifier circuit 130. The rectifier circuit 130 is connected to the secondary 164 of the transformer 160 by the conductors 134. The secondary 164 has two conductors that are referred to as a first conductor 168 and a second conductor 170. During the first duty cycle, current flows from the first conductor 168 to the second conductor 170. During the second duty cycle, current flows from the second conductor 170 to the first conductor 168.

As shown in FIG. 4, the rectifier circuit 130 has two rectifiers. The first rectifier includes diodes D1 and D2, resistors R1 and R2, and capacitor C1. The second rectifier includes diodes D3 and D4, resistors R3 and R4, and capacitor C2. The first conductor 168 is connected to the anode of a diode D1 and the cathode of a diode D2. The second conductor 170 is connected to the anode of a diode D3 and the cathode of a diode D4.

During the first duty cycle, the first rectifier is active. More specifically, current flows through diode D1 to current sensing resistor R2. The current then flows through diode D4 and back to the secondary 164 of the current transformer 160. A low pass filter of R1 and C1 filters the pulse voltage generated by the resistor R2 to a DC voltage that is output on the positive conductor 138. The voltage on positive conductor 138 has a DC magnitude that corresponds to the current magnitude flowing through the primary 118 of the transformer 114 during the first duty cycle.

During the second duty cycle, the second rectifier is active. Thus, current flows though diode D3 to a current sensing resistor R4 and returns to the secondary 164 of the current transformer 160 by way of the diode D2. A low pass filter of R3 and C2 filters the pulse voltage generated by the resistor R4 and outputs a DC voltage on the negative conductor 140. The voltage on the negative conductor 140 has a magnitude that corresponds to the magnitude of current flowing through the primary 118 of the transformer 114 during the second duty cycle.

At this point, the voltages on the conductors 136 represent the current flow through the primary 118 of the transformer 114. The magnitude of the voltage on the positive conductor 138 reflects the current flow during the first duty cycle and the magnitude of voltage on the negative conductor 140 reflects the current flow during the second duty cycle. The MCU 150 analyzes the voltages to determine if the current flow is balanced. More specifically, the MCU 150 determines if the current flow through the primary 118 during the first duty cycle is equal to the current flow during the second duty cycle.

Figure 5:
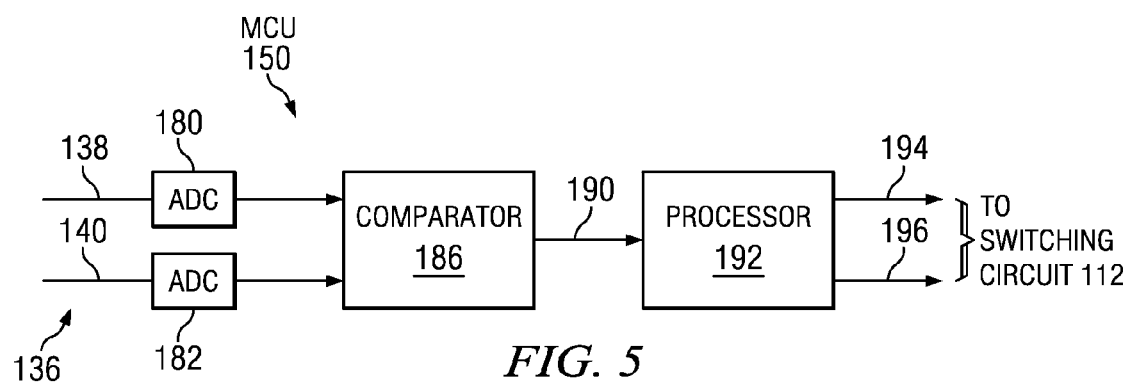
FIG. 5 is a block diagram of an embodiment of the MCU of FIG. 1.
Figure 6:
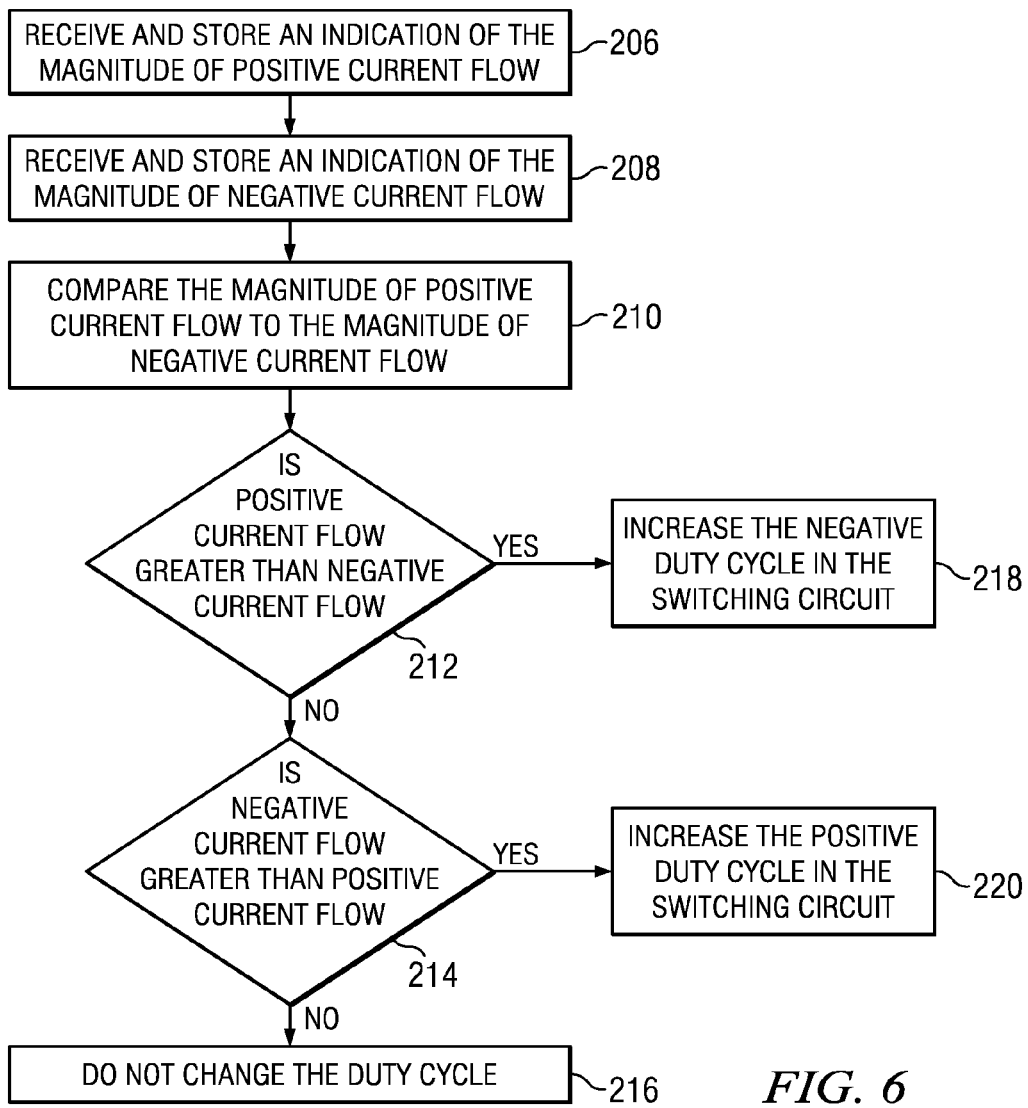
FIG. 6 is a flow chart describing the function of the MCU of FIG. 6.

An embodiment of a block diagram of the MCU 150 is shown in FIG. 5 and an embodiment of its operation is shown by the flow chart of FIG. 6. The positive conductor 138 of the rectifier circuit 130 is connected to a first analog to digital converter 180 (ADC 180). The negative conductor 140 is connected to a second analog to digital converter 182 (ADC 182). The analog to digital converters 180, 182 covert the analog signals or voltages from the rectifier circuit 130 to digital signals. Because only one duty cycle at a time is sensed, the first digital converter 180 may receive and store the indication of the magnitude of positive current flow as shown in step 206 of FIG. 6. Likewise, the second digital to analog converter 182 may receive and store the indication of negative current flow as shown in step 208 of FIG. 6. The storage with the digital to analog converters enables their output values to be processed at a later time.

The digital signals are input to a comparator 186. The comparator 186 determines the difference between the digital signals generated by the digital to analog converters 180, 182 and generates a voltage on line 190 indicative of the difference. The comparison is shown as step 210 in FIG. 6. The line 190 is an input to a processor 192. It is noted that only one duty cycle at a time is sensed and rectified by the rectifier circuit 130. Therefore, the comparator 186 may store a value generated by the first analog to digital converter 180 during the first duty cycle and compare it to the value generated by the second analog to digital converter 182 during the second duty cycle.

The processor 192 analyzes the data from the comparator 186 to determine if the current flowing through the primary 118 of the transformer 114 is balanced. In the embodiment of FIG. 6, decision step 212 determines if the positive current flow is greater than the negative current flow. If not, decision step 214 determines if the negative current flow is greater than the positive current flow. If not, no change in the duty cycle is performed as indicated by step 216.

In order to balance the current through the primary 118 of the transformer 114, the processor 192 controls the switches Q1-Q4 in the switching circuit 112 via lines 194 and 196. In the embodiment of FIGS. 2 and 4, the line 194 controls Q1 and Q4 and line 196 controls Q2 and Q3. By turning the switches Q1-Q4 off and on for specific periods, the processor 192 controls the duty cycles of the signals driving the transformer 114. If more current is flowing through the primary 118 of the transformer 114 during one duty cycle than the other, the processor 192 changes the duty cycle to balance the current flow. More specifically, as shown in FIG. 6, if the positive current flow is greater than the negative current flow, the negative duty cycle is increased as shown by step 218. It is noted that the ratio of negative current to positive current may be increased. Likewise, if the negative current flow is greater than the positive current flow, the positive current flow, or the ratio of positive to negative current flow, is increased as shown in step 220.

In some embodiments, the comparator 186 is incorporated into the processor 192. Therefore, the analog to digital converters 180, 182 output the values they generate directly to the processor 192. The processor 192 then analyzes the values to determine if one duty cycle is producing more current flow through the primary 118 of the transformer 114 than the other duty cycle.

Figure 7:
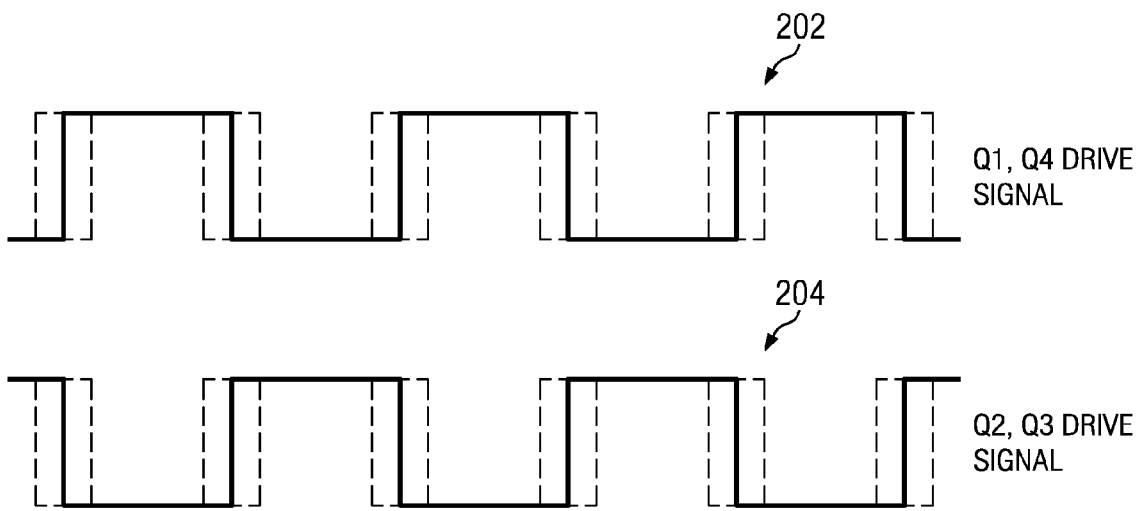
FIG. 7 is an example of the signals used to drive the switches of FIG. 1 and the variations to the signals that are used to adjust to the duty cycles.

An example of the duty cycle adjustments is shown in FIG. 7, which is a diagram of an embodiment of the signals on lines 194, 196 that control Q1-Q4. The first graph 202 shows an embodiment of a pulse width modulated signal that controls Q1 and Q4. It is noted that this signal is reflective of the voltages applied to the transformer 114. However, the signals that drive the transformer 114 may be somewhat distorted due to inductance and capacitance associated with the transformer 114 and other circuit components. The second graph 204 shows an embodiment of pulse width modulated signals that may be applied to Q2 and Q3.

The dashed portions of the graphs 202, 204 show the variations in the widths of the signals that may be applied to Q1-Q4 by the processor 192. By changing or modulating the pulse widths, the duty cycles applied to the primary 118 of the transformer 114 may be varied to balance the current. For example, the first duty cycle may be increased by increasing the time in which Q1 and Q4 are closed relative to the time in which Q2 and Q3 are open. Likewise, the second duty cycle may be increased by increasing the time in which Q2 and Q3 are closed and reducing the time in which Q1 and Q2 are open. In addition, the time in which Q1-Q4 are all open and no signal is driving the transformer 114 may be varied.

By continuously analyzing the current flowing through the primary 118 of the transformer 114 and balancing the current, the full bridge converter 100 can balance the current and eliminate DC current. Even as the tolerances of some components change over time or are affected by environmental fluctuations, the full bridge converter 100 can continue to eliminate the DC current.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method for balancing current in a transformer, wherein said transformer is driven by a signal having a first duty cycle and a second duty cycle, wherein said current of said first duty cycle is opposite the current of said second duty cycle, said method comprising:
    sensing the current flow through said transformer during said first duty cycle, wherein said sensing the current during said first duty cycle comprises generating a first voltage that is representative of the magnitude of said current during said first duty cycle and wherein said sensing the current during said second duty cycle comprises generating a second voltage that is representative of the magnitude of said current during said second duty cycle;
    sensing the current flow through said transformer during said second duty cycle;
    comparing the magnitude of said current during said first duty cycle to the magnitude of said current during said second duty cycle;
    adjusting the magnitude of current during said first duty cycle so said magnitude of the current during said first duty cycle is substantially equal to said magnitude of the current during said second duty cycle.

2. The method of claim 1, wherein said comparing comprises comparing said first voltage to said second voltage.

3. The method of claim 2, wherein said first duty cycle and said second duty cycle are based on a pulse width modulated signal and wherein adjusting said first duty cycle comprises adjusting the width of said pulse width modulated signal.

4. The method of claim 1, wherein said first duty cycle and said second duty cycle are generated by turning switches on and off and wherein said adjusting comprises changing the periods in which said switches are on and off.

5. The method of claim 1, wherein said first duty cycle is controlled by at least one first switch having an open state and a closed state and wherein said adjusting comprises changing the time in which said first switch is in said closed state.

6. The method of claim 1, wherein said first duty cycle is controlled by at least one first switch having an open state and a closed state and wherein said adjusting comprises changing the time in which said first switch is in said open state.

7. A full bridge converter comprising:
a switching circuit having an input connectable to an input voltage and an output, wherein an AC voltage is outputable on said output;
a first transformer wherein the primary of said first transformer is connected to said output of said switching circuit;
a current sensor located between said output of said switching circuit and said first transformer, wherein said current sensor provides an indication of the current flowing through the primary of said first transformer, wherein said current sensor is a second transformer having a primary and a secondary, and wherein said primary of said second transformer is connected in series between said output of said switching circuit and the primary of said first transformer;
a processor, wherein said processor receives said indication from said current sensor, and wherein said processor controls said switching circuit based on said indication from said current sensor.

8. The full bridge rectifier of claim 7, wherein said indication includes the magnitude and direction of current flow.

9. The full bridge converter of claim 7, wherein the secondary of said second transformer is connected to at least one rectifier, said at least one rectifier outputting a voltage based on the magnitude and direction of current flow in said primary of said second transformer.

10. The full bridge converter of claim 7, wherein the secondary of said second transformer is connected to a first rectifier and a second rectifier, wherein current flowing in a first direction is rectified by said first rectifier and wherein current flowing in a second direction is rectified by said second rectifier.

11. The full bridge converter of claim 10, wherein said first rectifier is connected to a first low pass filter and wherein said second rectifier is connected to a second low pass filter, the outputs of said first low pass filter and said second low pass filter being connected to said processor.

12. The full bridge converter of claim 7, wherein:
said secondary of said second transformer comprises a first terminal and a second terminal;
said first terminal is connected to the anode of a first diode and the cathode of a second diode;
said second terminal is connected to the anode of a third diode and the cathode of a fourth diode;
a first resistor is connected between the cathode of said first diode and a first output;
a second resistor is connected between the cathode of said first diode and the anode of said fourth diode;
a third resistor is connected between the cathode of said third diode and a second output;
a fourth resistor is connected between the cathode of said third diode and the anode of said second diode;
a first capacitor is connected between said first output and the anode of said fourth diode; and
a second capacitor is connected between said second output and the anode of said second diode.

13. The full bridge converter of claim 12, wherein a voltage on said first output is representative of the magnitude of current flowing in a first direction through the primary of said first transformer and wherein a voltage on said second output is representative of the magnitude of current flowing in a second direction through the primary of said first transformer.

14. The full bridge converter of claim 7, wherein said processor has a first input and a second input, wherein the voltage at said first input is representative of current flowing in a first direction through the primary of said first transformer and wherein the voltage at said second input is representative of current flowing in a second direction through the primary of said first transformer.

15. The full bridge converter of claim 7, wherein said switching circuit has at least one first switch that enables current to flow through said primary of said first transformer in a first direction and at least one second switch that enables current to flow through the primary of said first transformer in a second direction, and wherein said at least one first switch and said at least one second switch are controllable by said processor.

16. The full bridge converter of claim 15 and further comprising a comparator connected between said current sensor and said processor, said comparator providing an indication to said processor as to the difference between current flowing in a first direction through said primary of said first transformer and current flowing in a second direction through said primary of said first transformer.

17. The full bridge rectifier of claim 16, wherein said processor receives said indication from said comparator and controls said switching circuit to cause the current flowing in a first direction through the primary of said first transformer to equal the current flowing in a second direction through the primary of said first transformer.

18. The full bridge rectifier of claim 7, wherein said AC voltage is a pulse width modulated signal, and wherein said switching circuit controls the duty cycles of said pulse width modulated signal.

* * * * *